United States Patent [19]

Baer

[11] Patent Number: 4,540,176
[45] Date of Patent: Sep. 10, 1985

[54] MICROPROCESSOR INTERFACE DEVICE

[75] Inventor: Ralph H. Baer, Manchester, N.H.

[73] Assignee: Sanders Associates, Inc., Nashua, N.H.

[21] Appl. No.: 526,307

[22] Filed: Aug. 25, 1983

[51] Int. Cl.³ .......................... G06F 3/02; A63H 3/14
[52] U.S. Cl. ................................ 273/148 B; 446/302; 446/327; 273/85 G
[58] Field of Search ............... 446/327, 297, 299, 484, 446/491, 302, 295, 405, 304, 305, 391, 306, 300, 301, 353, 354; 434/310, 311, 312, 313, 314, 315; 364/410; 273/85 G, 148 B

[56] References Cited

U.S. PATENT DOCUMENTS 3,162,980  12/1964  Hellman ............................... 446/302
3,343,281   9/1967  Greer, Jr. et al. ................... 434/313

OTHER PUBLICATIONS

WO83/02188, PCT/GB82/00344, "Early Learning Device", Published Jun. 23, 1983.

Primary Examiner—Mickey Yu
Attorney, Agent, or Firm—Louis Etlinger; Richard I. Seligman

[57] ABSTRACT

A user interface device for interfacing with a microprocessor driving a video display. The device is particularly adapted for the use of small children in interfacing with a microprocessor operating to drive a video game or a personal computer. The device comprises a hand puppet adapted to be worn on the user's hand. Pressure-sensitive switches, a light pen, a motion detector, and a speaker are included within the puppet's head and body to allow input by the user through the devices within the puppet and output by the microprocessor at the puppet over the speaker.

11 Claims, 6 Drawing Figures

MICROPROCESSOR INTERFACE DEVICE

BACKGROUND OF THE INVENTION

The present invention relates to interface devices for use with computers and, more particularly, to a hand puppet containing input/output devices to be used in conjunction with a video game and/or personal computer.

As is well known in the art, the graphics capabilities of both personal computers and video games have frequently been applied to the presentation of cartoon characters that appear to address the human viewer of the display by gesturing or "speaking" to him or her. Thus, a children's game might involve a simulated conversation, or more often, a monolog, during which the graphic figure or face or the screen talks to the child, often accompanied by gesturing and other animation, including motions of the graphic figures to enhance the realism of the simulated "conversation". Until now, the common device available for the child to input to the game or computer, on the other hand, consisted of devices such as joysticks, track balls, key-boards and the like. For very small children, such devices are not conducive to a two-way "conversation" between the child and the character of the display.

It is the object of the present invention to extend such game systems, particularly for very small children by providing a surrogate "person" in the form of a hand puppet, stuffed toy, or other hand-held, doll-like figure, generally manipulated by the viewer, where this "puppet" is dimensionally and artistically compatible with its television screen correspondent. The object is to lend a feeling of spatial dimension to a video game on the one hand by extending the action beyond the two-dimensional limit of the planar video game surface; and on the other hand, to create the illusion of allowing the puppet to physically "enter" the screen scenario and become a part of it.

By way of an example, assume that the game in progress is a small child's adventure story involving familiar characters from a typical children's television program. Thus, this might involve one of the "Sesame Street" characters, say Big Bird, on-screen, while the hand puppet might be, say Fozzie the Bear (from the same children's program). Game play elements would be, of course, delivered in standard video game fashion by means of a plug-in ROM cassette or other pre-formatted data delivery means to the personal computer or video game. Interaction derives from the appropriate use of position-sensitive or push-button switches built into the hand puppet and connected by cable to the normal hand control terminals of the system. The function of these various switches may be varied in accordance with the dictates of a particular game. Thus, in a conversational scenario, where the hand puppet engages a figure on-screen in apparent conversation, the button-activated switches might be assigned to the functions of synthetically "speaking" the words "yes" or "No". Further-more, the availability of low-cost voice recognition devices could make the carrying on of simple, responsive "conversations" between the two characters entirely feasible. In such a scenario, the child would become totally involved by providing both the interactive voice responses for the hand puppet as well as its physical manipulation in concert with the screen action, and by exercising the functions provided by the aforementioned push-button switches and the like. Such play-action for the small child would encourage much "hugging", "shoving", "swatting", etc. which will activate the switches and other devices causing appropriate response in the game display. Practical experience with this novel format of interactive video game play for children has shown that prolonged and enjoyable play by the child is entirely feasible even when the "scenery" and "action" offered by the resident game program consists of a relatively small number of primitive graphics, sound, and action modules.

Wherefore, it is the object of the present invention to provide such an interface device for use by small children in interfacing with video games and personal computers.

SUMMARY

The foregoing objective has been met by the user interface device of the present invention for interfacing with a microprocessor driving a video display comprising a hand puppet adapted to be worn on the user's hand; input means disposed within the puppet for developing input signals to the microprocessor; and, first connector means for operably connecting the input means to the microprocessor as an input thereto.

In the preferred embodiment, the puppet includes an arm and hand portion and the input means includes a switch disposed within the hand portion adapted to be activated by the user pushing the hand portion against a resilient surface.

Additionally, the input means includes light pen means for generating an output signal as a function of light entering an input opening thereof when the input opening is placed against the video display being driven by the miroprocessor whereby the logic of the game or personal computer can sense both the presence and position of the device on the screen of the video display.

In the preferred embodiment, an additional motion detector is contained within the head of the puppet generating separate signals when the head is nodded "yes" or shaken "no".

To further enhance the feeling of interaction, the puppet of the present invention in its preferred embodiment includes a loudspeaker connected to be driven by the microprocessor whereby speech and other sounds can emanate from within the puppet.

DESCRIPTION OF THE PREFERRED EMBODIMENT

The description which follows hereinafter is with respect to a hand puppet. Those skilled in the art will recognize that other stuffed toys or hand-held doll-like figures could be adapted according to the teachings of the present invention. Accordingly, in the description and claims which follow, the term "puppet" is intended to include all such devices within the scope and the spirit of the present invention.

Figure 1:
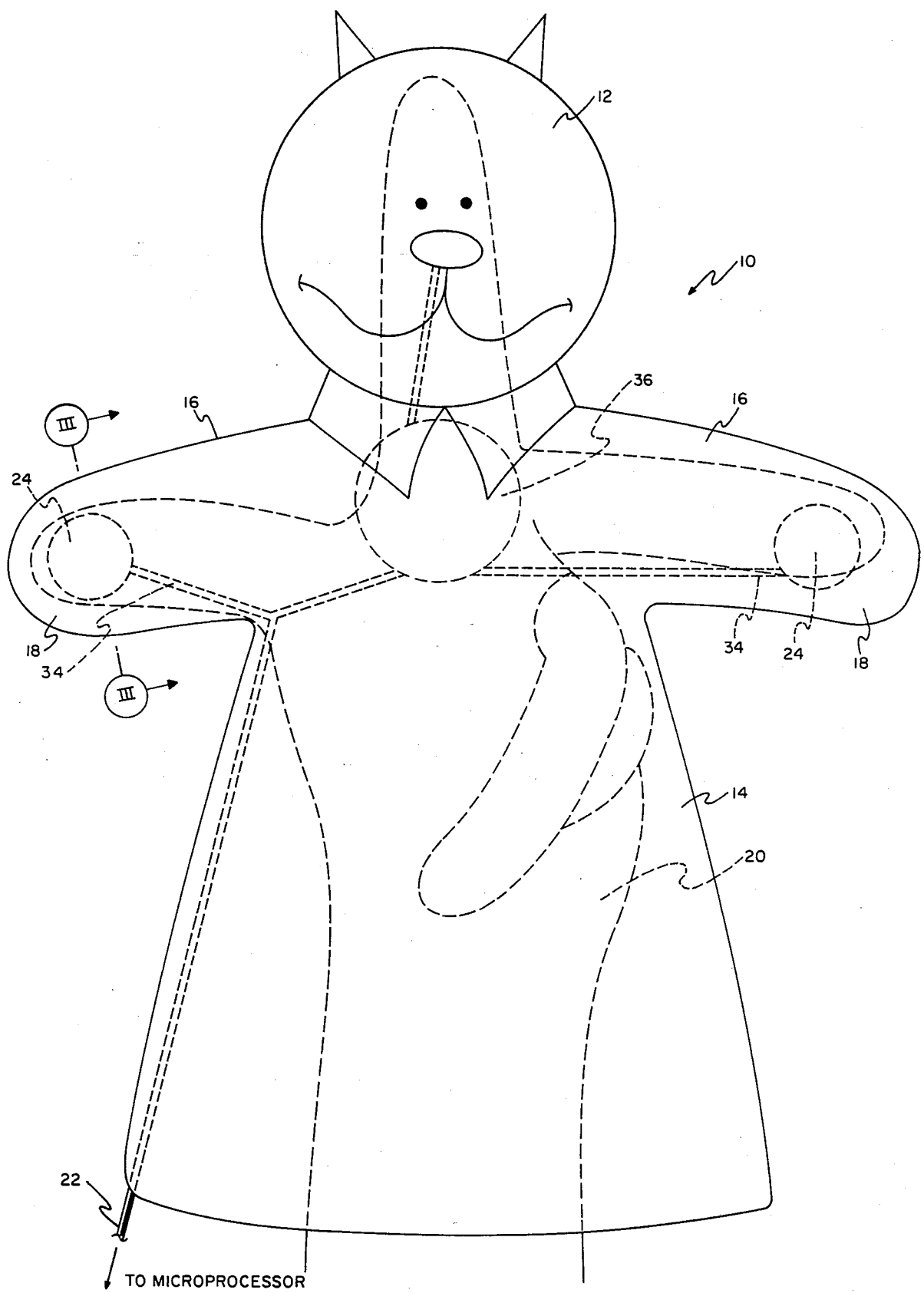
FIG. 1 is a front elevation of a puppet interface device according to the present invention.

Referring first to FIG. 1, the interface device of the present invention is shown as a hand puppet, generally indicated as 10. Puppet 10 includes a head 12 of a solid material such as plastic and a body portion 14 including arms 16 and "hands" 18 of a fabric material adapted to be worn on a user's hand, shown ghosted at 20. The puppet interface device 10 of the present invention is worn as with any hand puppet with the user's thumb in one arm 16, the index finger inserted into the head 12, and the middle finger into the other arm 16. In this manner, the entire body portion 14 and head 12 can be rotated about the vertical axis by twisting the user's wrist, the hands 18 can be clapped together or used to "hug" by bringing the user's thumb and middle finger together, and the head 12 can be "nodded" by flexing the user's index finger.

According to the present invention, a cable 22 is sewn into the body portion 14; said cable 22 being connected at one end to various switches, sensors, and a speaker to be more fully described hereinafter. The other end of the cable 22 is adapted to connect to the microprocessor as an input thereto.

Figure 3:
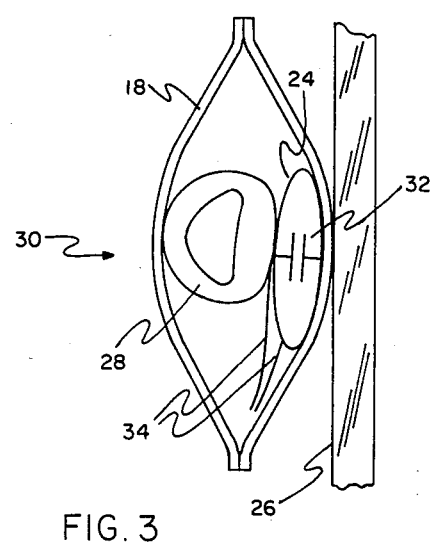
FIG. 3 is a cutaway drawing through the hand portion of the puppet of FIG. 1 in the plane III—III showing the placement and method of activation of a switch contained therein.

A pair of pressure-sensitive switches 24 connected to the cable 22 are disposed in respective ones of the hands 18. As shown in FIG. 3, if the hand 18 containing switch 24 is placed against a resilient surface such as the screen 26 of the video display, pressure by the finger 28 in the direction of arrow 30 will close the contacts 32 of the switch 24 with an appropriate change of status of wires 34 which are connected into the cable 22.

Figure 2:
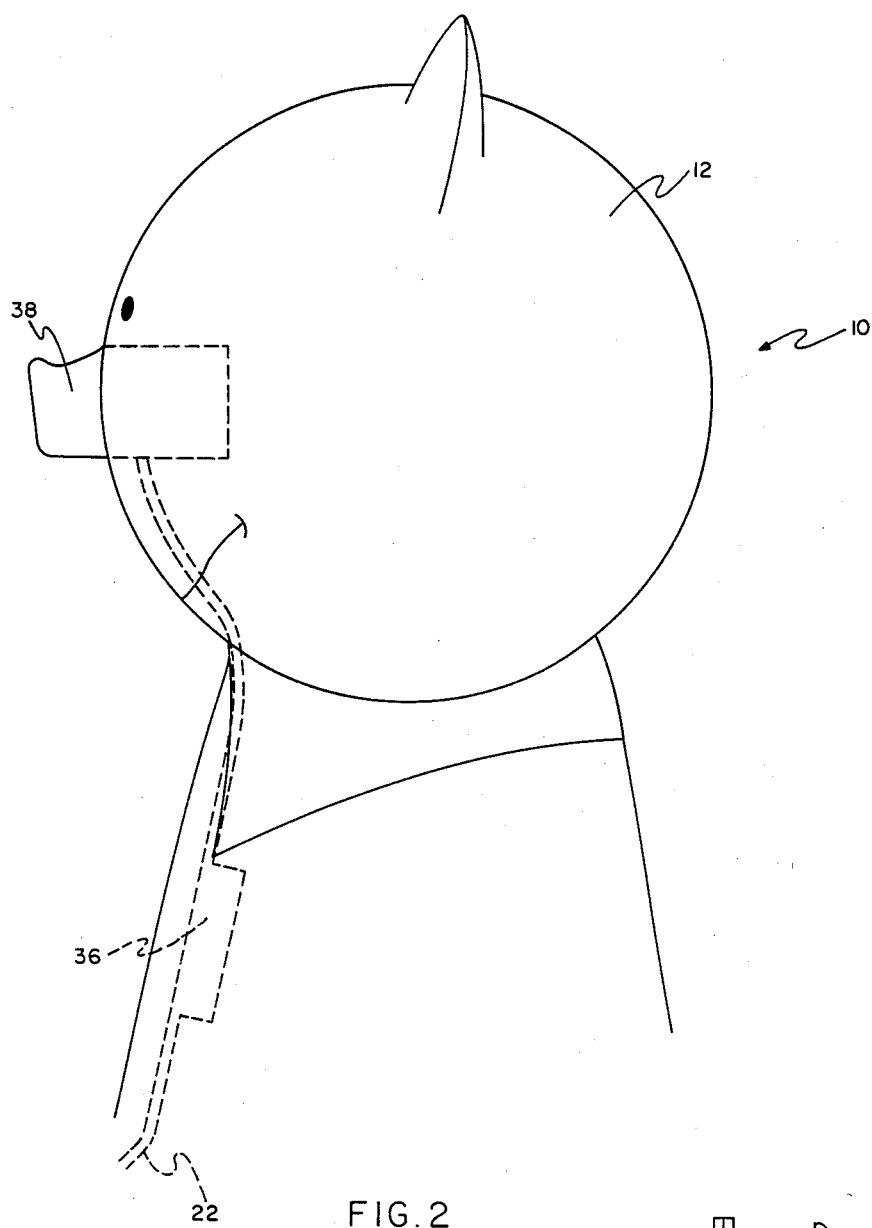
FIG. 2 is a side elevation of the puppet interface device of FIG. 1.

A speaker 36 is also connected to the cable 22 to be driven by the microprocessor as an output device. It is convenient to have the speaker 36 sewn into the body portion 14 below the head 12 such that sound emerging therefrom appears to be coming from the mouth of the puppet. Finally, as best seen in the side view of FIG. 2, the nose assembly 38 contains a light pen and motion detector to be more fully described hereinafter, both of which are operably connected into the cable 22. Alternatively, the speaker 36 may be connected to the output of a magnetic audio tape player controlled by the game or computer microprocessor in accordance with co-pending application Ser. No. 468,226, filed Feb. 22, 1983, entitled "Synchronized Audio Tape Associated Video Games" and assigned to the common assignee of this application.

Figure 4:
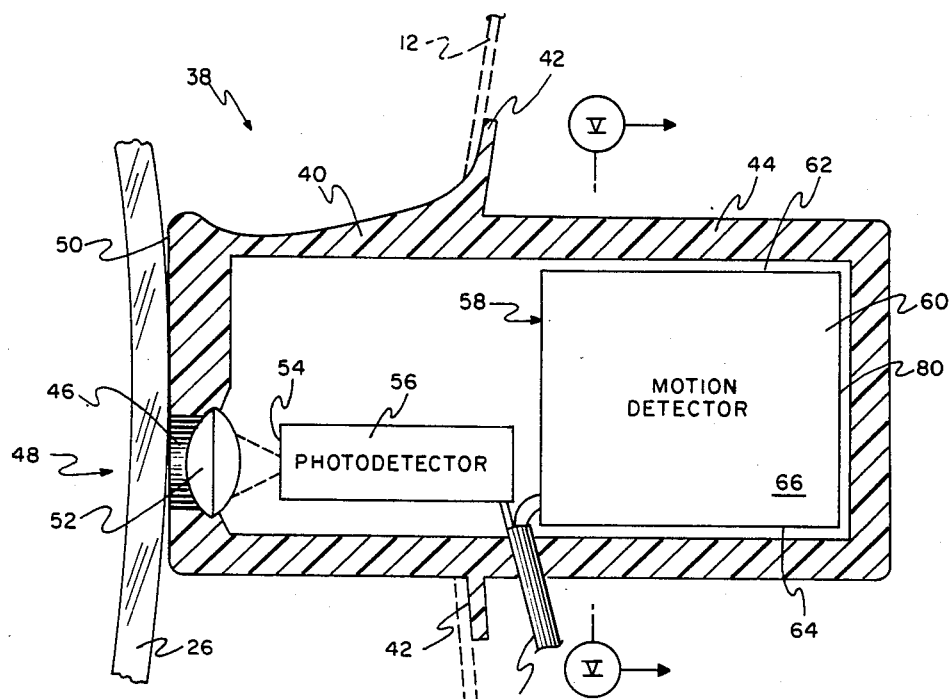
FIG. 4 is an enlarged, cutaway drawing through the nose portion of the puppet of FIG. 2 showing the light pen and motion detector contained therein.

Turning now to FIG. 4, the nose assembly 38 is shown in greater detail in a cutaway side elevation. Nose assembly 38 can be conveniently be made of plastic and is a housing having an outer portion 40 in the appropriate shape of a nose with tabs 42 adapted to connect to the balance of the head 12. The inner portion 44 is simply a box shape since it is not seen. The nose assembly 38 contains an inlet hole 46 through which light as symbolized by the arrow 48, can pass if the front surface 50 of the nose assembly 38 is pressed against the screen 26 of the video display. A lens 52 is placed within the hole 46 to focus light 48 entering hole 46 onto the input surface 54 of a photo detector 56, the electrical output of which is connected into cable 22. Thus, as light 48 enters hole 46, it is focused by lens 52 onto the input surface 54 of photo detector 56 which outputs a signal on cable 22 to the microprocessor, thus closing the loop as to the presence and position of the nose assembly 38 with respect to the display on screen 26. Any protruding portion such as a finger, or the like, could also be used for this purpose.

Figures 5, 6:
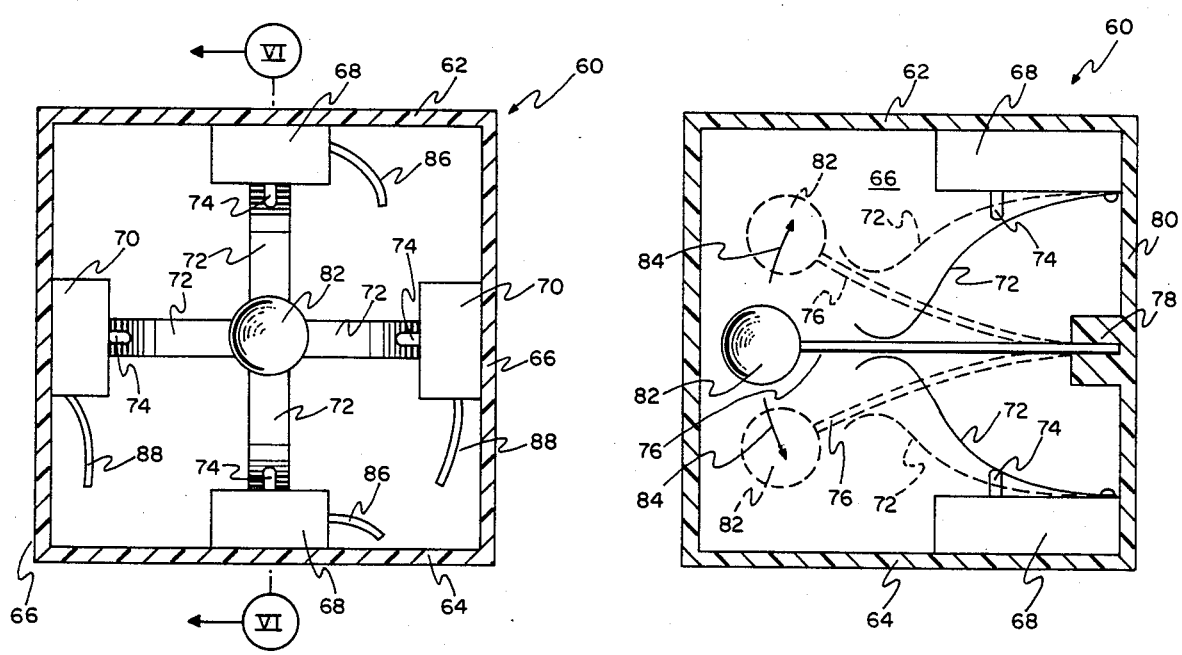
FIG. 5 is a cutaway drawing through the motion detector of FIG. 4 in the plane V—V.
FIG. 6 is a cutaway drawing through the motion detector of FIG. 5 in the plane VI—VI.

A motion detector 28 is also contained within the nose assembly 38 and operably connected to the cable 22. The details of motion detector 58 are shown with greater particularity in FIGS. 5 and 6. The motion detector 58 is particularly adapted to generate a first signal to the microprocessor on cable 22 in the presence of a nodding or "yes" motion of the head 12 while outputting a second signal on cable 22 to the microprocessor when the head 12 and body portion 14 are twisted about the vertical axis as a shaking or "no" indication. To accomplish this, the motion detector 58 comprises a housing 60 of generally square cross-section having a top wall 62, a bottom wall 64 and a pair of side walls 66. A pair of "yes" switches 68 are mounted, respectively, to the top and bottom walls 62, 64 in opposition to one another. In similar fashion, a pair of "no" switches 70 are mounted in opposition to one another on the side walls 66. Each of the switches 68, 70 has a resilient arm 72 curving towards the center where the arms meet. The arms 72 are adapted to depress and activate the plungers 74 of the switches 68, 70 when they are moved away from their center position as shown ghosted in FIG. 6. A spring rod 76 extends horizontally between the arms 72 from an end post 78 in the back wall 80 adjacent the inner end of the nose assembly 38. The opposite end of the spring rod 76 is fitted with a weight 82. As shown in FIG. 6, as the head 12 of the puppet is nodded in a "yes" manner, the weight 82 will move up and down in the direction of the arrows 84 to the ghosted positions shown thus flexing the resilient arms 72 associated with the "yes" switches 68 alternatively opening and closing them to generate signals on the wires 86 which are connected to the cable 22. In similar fashion, a horizontal twisting motion indicating "no" will cause the weight 82 to flex the spring rod 76 in a horizontal plane, thus flexing the resilient arms 72 connected to the switches 70 creating an associated output signal on the wires 88 connected into cable 22.

Additionally, rolling ball or mercury switches commonly used in control and toy applications for sensing object attitudes could be used in the present invention to indicate, for example, lying down; or sensors to ascertain velocity of movements; or sensors to indicate, say, up and down movement such as for excitement, or the like.

Thus, it should be apparent to those skilled in the art that the interface device 10 of the present invention comprising a puppet containing various devices for communicating to and from a microprocessor employed as a video game or a personal computer provides a child with an interface device with which he can identify and which can be operated easily and in a natural manner in an interactive environment with the video display being created.

Wherefore, having thus described my invention, I claim:

1. A user interface device for interfacing with a microprocessor of a video game unit comprising:
 (a) a hand puppet adapted to be worn on the user's hand;
 (b) input swith means disposed within said puppet developing input signals to the microprocessor, said input switch means functioning in conjunction with the user's hand within the puppet; and, (c) first connector means for operably connecting said input switch means to the microprocessor as an input thereto.

2. The device of claim 1 wherein:
(a) said puppet includes an arm and hand portions; and,
(b) said input switch means includes a switch disposed within said hand portion adapted to be activated by the user pushing said hand portion against a resilient surface.

3. The device of claim 1 and additionally comprising:
(a) a loudspeaker disposed within said puppet; and,
(b) second connector means for operably connecting said loudspeaker to the microprocessor to be driven thereby.

4. The device of claim 3 wherein:
(a) the microprocessor is controlling a magnetic audio tape player; and,
(b) said loudspeaker is connected to said output of said magnetic tape player.

5. The device of claim 1, further including
light pen means for generating an output signal as a function of light entering an input opening thereof when said input opening is placed against the video display being driven by the microprocessor.

6. The device of claim 5 wherein:
said puppet includes a protruding portion and said light pen means is disposed within said protruding portion.

7. The device of claim 1, further including
motion detecting means for generating an output signal as a result of motion of said puppet.

8. The device of claim 7 wherein:
(a) said puppet includes a head portion and said motion detecting means is disposed in said head portion; and,
(b) said motion means is adapted to generate a first output signal portion in response to said head portion being nodded "yes" and a second output signal portion in response to said head portion being shaken "no".

9. The device of claim 7 wherein:
said motion detecting means is adapted to sense up and down motion signifying "excitement" or the like.

10. The device of claim 1, further including sensor means for indicating the attitude of said puppet such as vertical, lying down, or the like.

11. The device of claim 7 wherein:
said motion detecting means includes sensor means for indicating the velocity of motion of said puppet.

* * * * *